(12) United States Patent
Hsieh et al.

(10) Patent No.: US 7,168,841 B2
(45) Date of Patent: Jan. 30, 2007

(54) BACKLIGHT MODULE HAVING INDEPENDENT LIGHT SOURCE

(75) Inventors: Min-Hsun Hsieh, Hsinchu (TW); Chou-Chih Yin, Hsinchu (TW); Chun-Chang Chen, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 0 days.

(21) Appl. No.: 11/158,408

(22) Filed: Jun. 21, 2005

(65) Prior Publication Data
US 2006/0007702 A1    Jan. 12, 2006

(30) Foreign Application Priority Data
Jul. 7, 2004    (TW)    ............... 93120467 A

(51) Int. Cl.
*F21V 8/00*    (2006.01)

(52) U.S. Cl. ............ 362/613; 362/608; 362/610; 362/611; 362/612; 362/558

(58) Field of Classification Search ............ 362/31, 362/601, 608, 610, 611, 612, 613, 551, 555, 362/558
See application file for complete search history.

(56) References Cited

U.S. PATENT DOCUMENTS 6,296,383 B1 * 10/2001 Henningsen ............ 362/552
6,655,825 B2 * 12/2003 Muthu et al. ............ 362/561
6,878,892 B2 *  4/2005 Miyako et al. ............ 200/310

* cited by examiner

*Primary Examiner*—Laura K. Tso
(74) *Attorney, Agent, or Firm*—J.C. Patents

(57) ABSTRACT

A backlight module including an independent light source is provided. The backlight module includes a light generation device, a light transmission device, a light mixing device and a planar light generation device. The light generation device may include one or more light emitting components. The light transmission device may be adopted for receiving and transmitting the light emitted by the light generation device. The light mixing device may be adopted for mixing the light emitted by the light transmission device to generate a mixed linear light. The planar light generation device may comprise a light distributing portion for receiving the mixed linear light to generate a planar light.

27 Claims, 7 Drawing Sheets

BACKLIGHT MODULE HAVING INDEPENDENT LIGHT SOURCE

CROSS-REFERENCE TO RELATED APPLICATION

This application claims the priority benefit of Taiwan application serial no. 93120467, filed on Jul. 7, 2004. All disclosure of the Taiwan application is incorporated herein by reference.

BACKGROUND OF THE INVENTION

1. Field of the Invention

The present invention relates to a backlight module. More particularly, the present invention relates to a backlight module including an independent light source.

2. Description of Related Art

Generally, a conventional flat panel display device such as liquid crystal display (LCD) is a non-self-illuminant display. Therefore, a conventional LCD requires a device functioning as a light source, to provide planar or linear light, and this device is usually called a backlight module. Backlight modules are generally classified into two types, in which one is a direct type and the other is a side-edge type. The component of a conventional direct type backlight module includes, for example, lamp tubes such as cold cathode tubes, a diffusion sheet and a prism sheet. However, in order to provide uniform, planar light for the LCD, the intervals between the lamp tubes, and the distance between the lamp tubes and the diffusion sheet/prism sheet have to be precisely controlled to avoid non-uniform distribution of light. In addition, minimization of the thickness of the backlight module is limited by the distance between the lamp tubes and the diffusion sheet.

In a side-edge type backlight module, the light from the lamp tubes is introduced into a light guide plate to spread the light. Therefore, the thickness of the backlight module can be further minimized. However, the distribution of the planar light emitted from the side-edge type backlight module is still non-uniform. Moreover, it is still hard to enlarge the size of the side-edge type backlight module. In addition, the components of the two conventional backlight modules described above are complex. Accordingly, minimization of the thickness of the conventional backlight modules is a problem to be solved.

Furthermore, the two conventional backlight modules generate a lot of heat in operation. However, a normal operation of LCD requires a small and stable temperature range. Accordingly, heat dissipation of the conventional backlight modules is another problem to be solved.

Therefore, the U.S. Pat. No. 6,655,825 discloses a white backlight device of an LCD for solving the problems described above, wherein a light mixing optical fiber is provided for mixing red, green and blue light into a white light, and then the white light is introduced to a side edge of the light guide plate by using a light disperser, and the white light is projected to the LCD by the light guide plate. However, operation of the present backlight module is also classified into conventional side-edge type backlight module, thus it is hard to enlarge the size of the backlight module.

SUMMARY OF THE INVENTION

Therefore, the present invention is directed to a backlight module comprising an independent light source. The backlight module has an independent light generation device, wherein the light is transmitted to the backlight module by using a light transmission device. The color lights from different light transmission devices may be mixed to a linear light by using a light mixing device of the backlight module, and the linear light may be converted to a planar light via a planar light generation device. Accordingly, the thickness and size of the backlight module of the present invention may be thinner and larger than the conventional ones, and the problem of the heat sinking of the backlight module may also be solved.

According to one embodiment of the present invention, a backlight module comprising an independent light source is provided. The backlight module may comprise, for example, a planar light generation device, a light mixing device, a light generation device, and a light transmission device. The planar light generation device may comprise a light distributing portion. The light mixing device may be connected to the planar light generation device and disposed corresponding to the light distributing portion. The light generation device may be adopted for providing a light. The light transmission device may be connected between the light mixing device and the light generation device, wherein the light is transmitted to the light mixing device by the light transmission device and mixed to generate a mixed linear light, the mixed linear light is mixed by the planar light generation device to generate a planar light.

According to one embodiment of the present invention, a backlight module comprising an independent light source is provided. The backlight module may comprise, for example, a light mixing module, a light generation device and a light transmission device. The light mixing module may comprise, for example, a planar light generation device, a light mixing device. The planar light generation device may comprise a light distributing portion. The light mixing device may be connected to the planar light generation device and disposed corresponding to the light distributing portion. The light generation device may be adopted for providing a light. The light transmission device may be connected between the light mixing device and the light generation device, wherein the light is transmitted to the light mixing device by the light transmission device and mixed to generate a mixed linear light, the mixed linear light is mixed by the planar light generation device to generate a planar light.

One, part, or all of these and other features and advantages of the present invention will become readily apparent to those skilled in the art from the following description wherein there is shown and described one embodiment of this invention, simply by way of illustration of the best modes for carrying out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
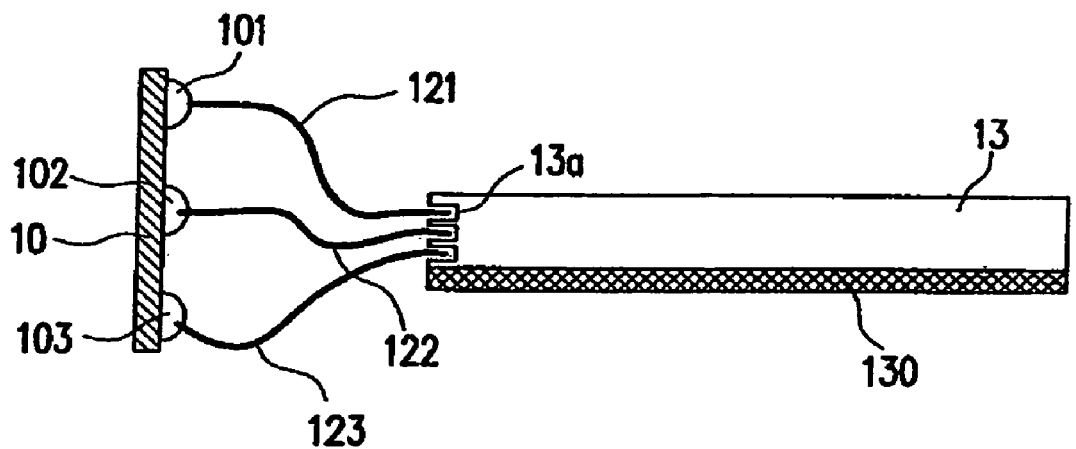
FIG. 1a is a schematic cross-sectional view of a light generation device and a light mixing device in accordance with an embodiment of the present invention.

Referring to FIGS. 1a–1e, the components of a backlight module comprising an independent light source according to one embodiment of the present invention is illustrated, wherein FIG. 1a is a schematic cross-sectional view of a light generation device and a light mixing device comprising, for example, a light generation device 10, light transmission devices 121, 122 and 123 and light mixing device 13. The light generation device 10 may comprise, for example, light emitting components 101, 102 and 103 for generating, for example but not limited to, red, green and blue lights respectively. In one embodiment of the present invention, the light generation device 10 is disposed independent of the backlight module, thus the heat sinking of the light emitting components 101, 102 and 103 of the light generation device may be performed independent of the backlight module. In addition, the heat generated by the light emitting components 101, 102 and 103 may not influence the normal operation of the LCD. In addition, the light emitted by the light emitting components 101, 102 and 103 are collected and transmitted by the light transmission devices 121, 122 and 123 respectively. The light mixing device 13 may comprise, for example, a reflection layer 130 in the bottom for reflecting the light transmitted from the light transmission devices 121, 122 and 123 to the light mixing device 13 to enhance the light mixing efficiency. The light transmission devices 121, 122 and 123 may be connected to a side surface 13a of the light mixing device 13 for emitting the light into the light mixing device 13. The light mixing device 13 may be adopted for mixing the light from the light transmission devices 121, 122 and 123 into a mixed linear light.

Figure 1B:
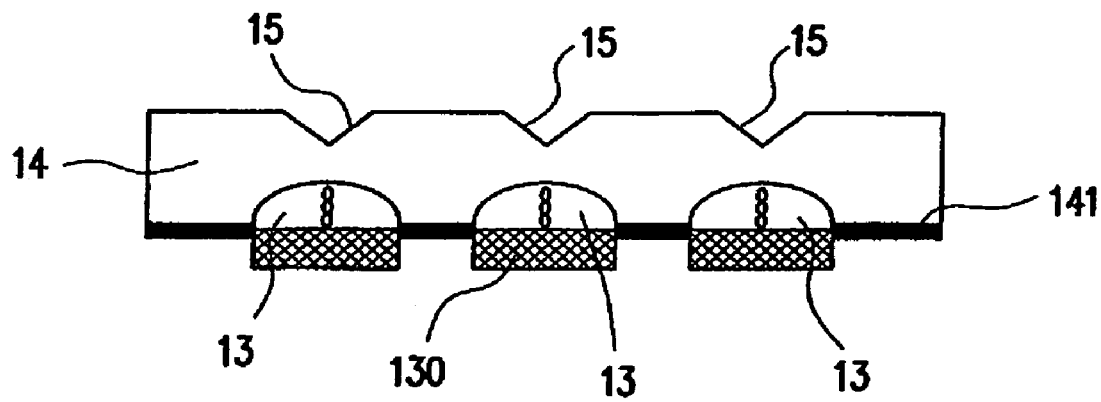
FIGS. 1b–1d are schematic cross-sectional views of a light mixing device and a planar light generation device in accordance with embodiments of the present invention.

FIG. 1b illustrates the schematic cross-sectional views of the light mixing device 13 and the planar light generation device 14. The bottom of the planar light generation device 14 may comprise a reflection layer 141 for reflecting the light emitted to the bottom of the planar light generation device 14 to enhance the light emitting efficiency. The top of the planar light generation device 14 may comprise a light distributing portion 5 for receiving the mixed linear light to generate a planar light. In one embodiment of the present invention, the light mixing device 13 may be, for example, lodged in the planar light generation device 14, and the position for lodging the light mixing device 13 may be, for example, under the light distributing portion 15.

Figure 1C:
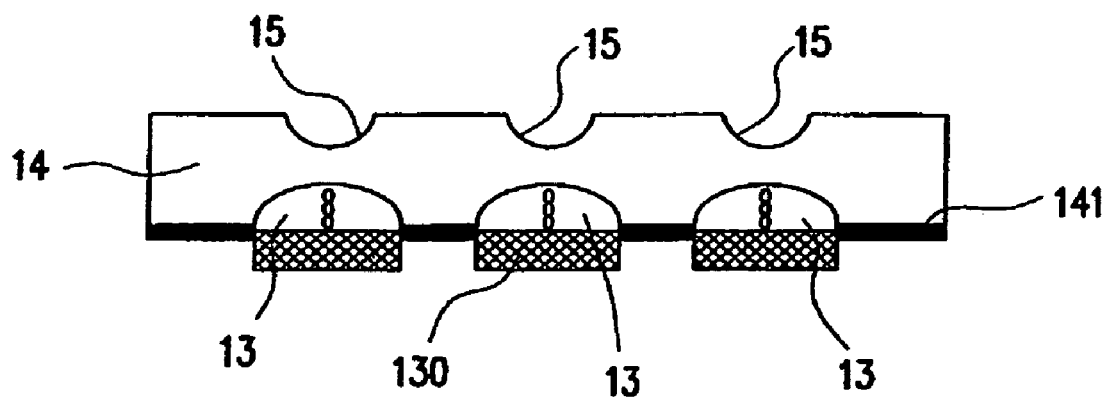
Figure 1D:
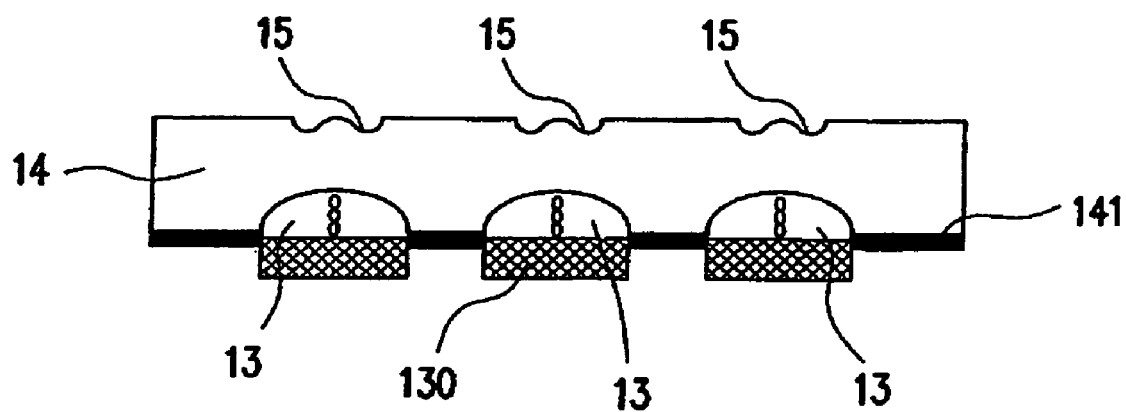
Figure 1E:
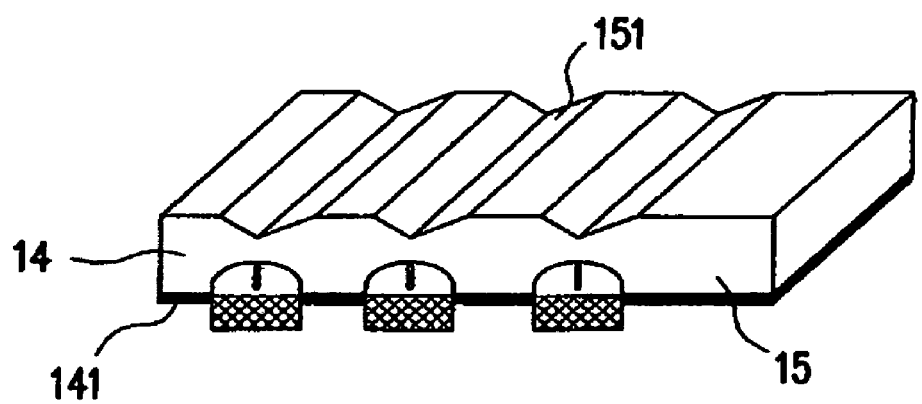
FIG. 1e is a schematic cross-sectional view of a planar light distributing portion in accordance with an embodiment of the present invention embodiment.

Referring to FIGS. 1b to 1e, the structure of the light distributing portion 15 may comprise a groove, wherein the shape of the groove may comprise V-shaped groove (shown in FIG. 1b), U-shaped groove (shown in FIG. 1c) or wavy shape groove (shown in FIG. 1d), or another shape that may be provided for reflecting light. As shown in FIGS. 1c and 1e, the light distributing portion 15 is illustrated as a V-shaped groove. When the light from the light mixing device 13 propagates to the light distributing portion 15, the light may be total internal reflected under a specific angle since the other side of the groove comprises a less dense medium such as air. For example, if the incident angle of the light to the V-shaped groove is θ; the critical angle of the material of the light mixing plate is θc, the light mat be total internal reflected as θ<2×(90 −θc). Likewise, as the groove is U-shaped groove or wavy shape, the light may be total internal reflected and dispersed wider a specific angle. In another embodiment of the present invention, a reflection layer 151 may be further disposed over the light distributing portion 15 to enhance the light distributing effect.

Figure 2A:
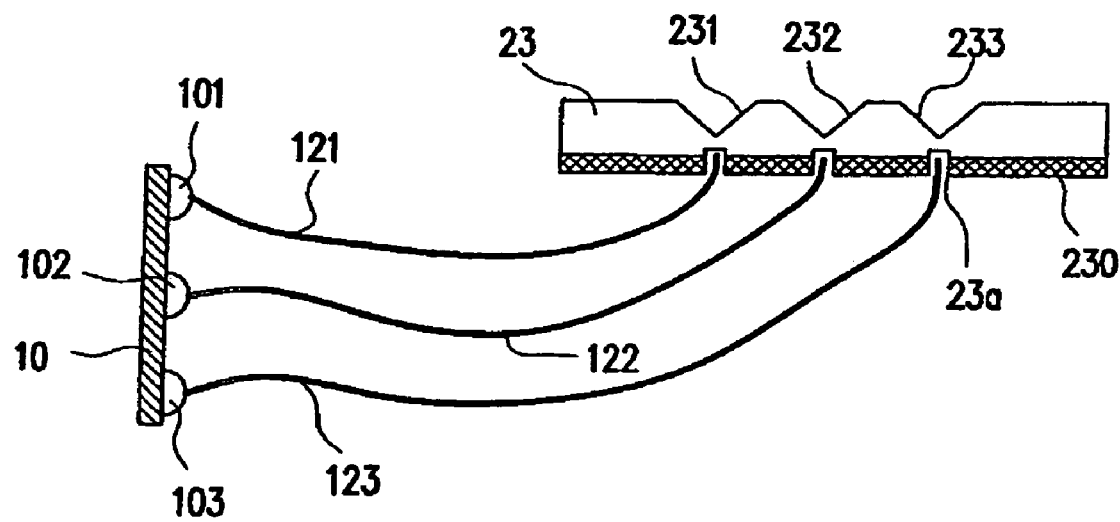
FIGS. 2a–2c are schematic cross-sectional views of a light generation device and a light mixing device in accordance with another embodiments of the present invention.
Figure 2B:
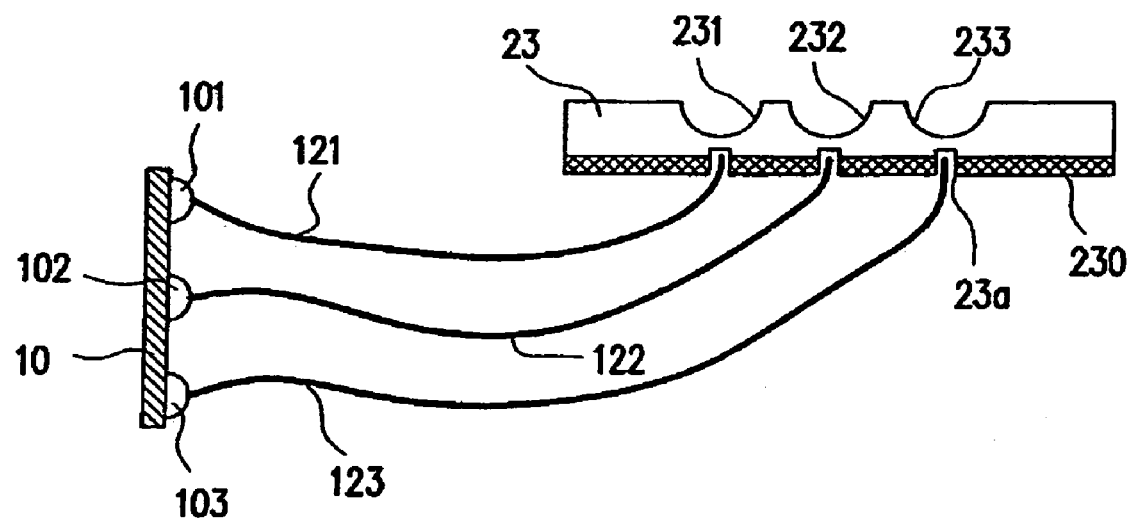
Figure 2C:
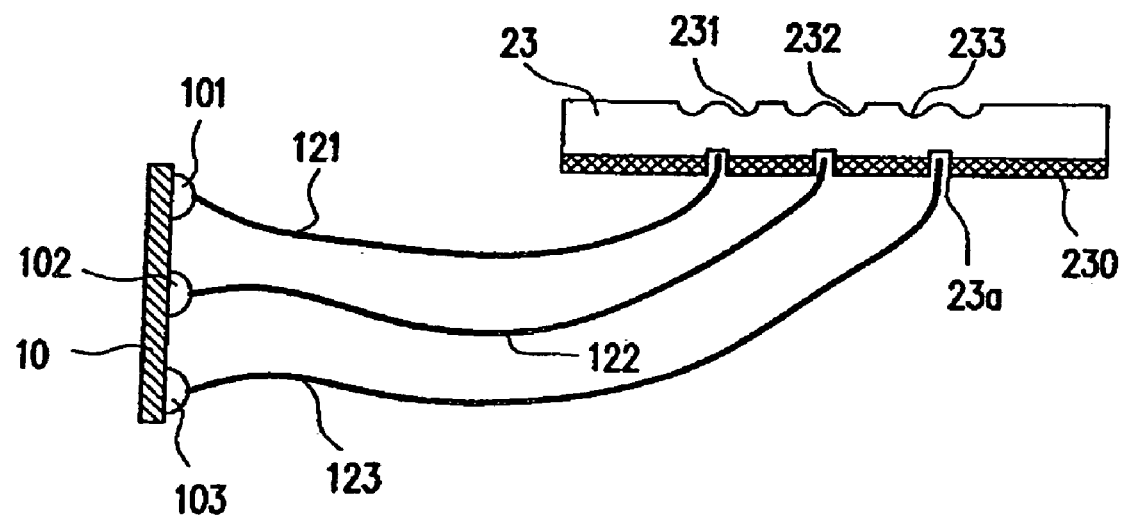
Figure 2D:
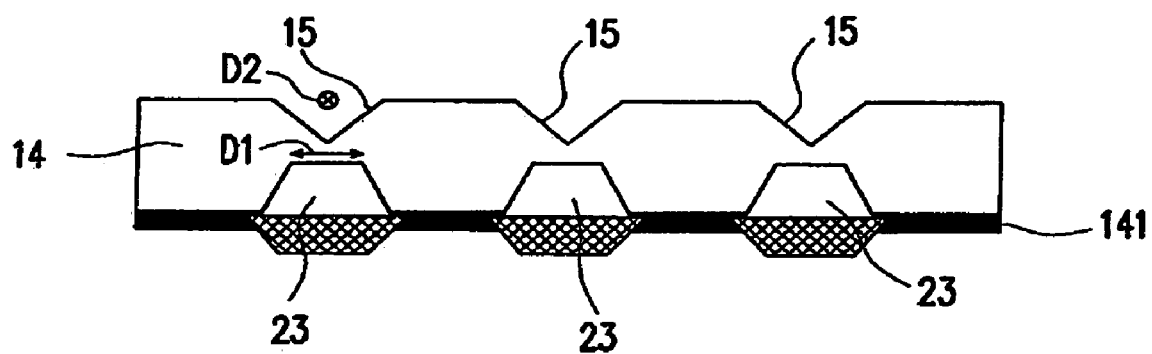
FIGS. 2d–2f are schematic cross-sectional views of a light mixing device and a planar light generation device in accordance with embodiments of the present invention.
Figure 2E:
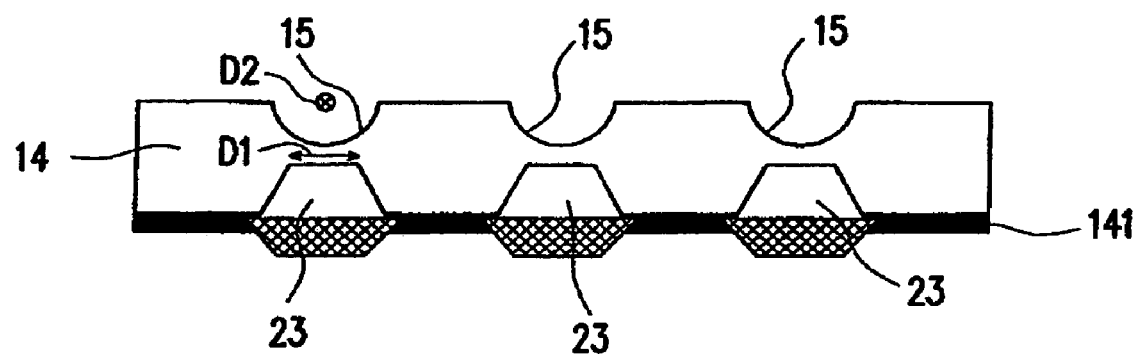
Figure 2F:
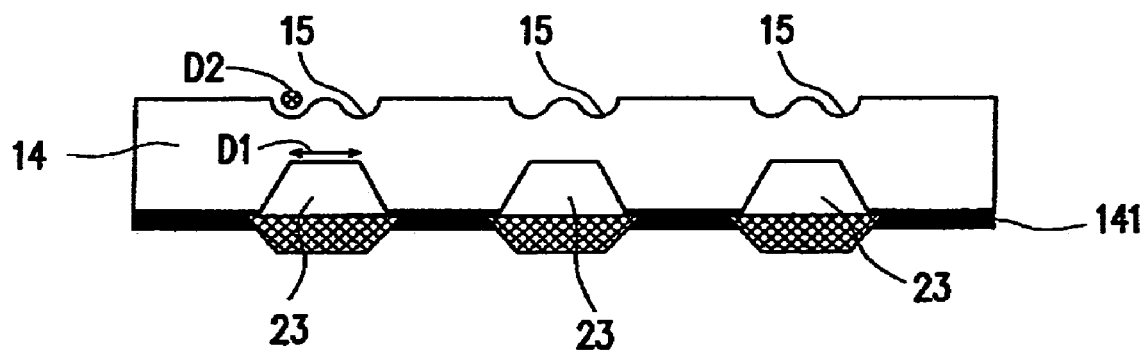

FIGS. 2a–2c and 2d–2e illustrates the components of a backlight module of an independent light according to another embodiment of the present invention, wherein FIG. 2a–2c illustrates a schematic cross-sectional view of a light generation device and a light mixing device comprising, for example, a light generation device 10, light transmission devices 121, 122 and 123, and a light mixing device 23. The light generation device 10 may comprises light emitting components 101, 102 and 103 for generating, for example but not limited to, red, green and blue lights respectively. The light generated by the light emitting components 101, 102 and 103 may be collected and transmitted to the light transmission devices 121, 122 and 123 respectively. The light mixing device 23 may comprise a reflection layer 230 in the bottom for reflecting the light to the light mixing device 23 to enhance the light mixing efficiency. The light transmission devices 121, 122 and 123 may be connected to the bottom surface 23a of the light mixing device 23. The light mixing device 23 may be provided for mixing the light emitted from the light transmission devices 121, 122 and 123 to generate a mixed linear light. The light mixing device may comprise a plurality of light distributing portions such as light distributing portions 231, 232 and 233. In one embodiment of the present invention, the amount of the light distributing portion may be substantially equal to the amount of the light transmission device. The structure of the light distributing portions 231,232 and 233 may comprise a groove, wherein the shape of the groove may comprise V-shaped groove (shown in FIG. 2a), U-shaped groove (shown in FIG. 2b) or wavy shape groove (shown in FIG. 2c), or another shape that may be provided for reflecting light. As shown in FIG. 2d–2f, the light distributing portion 15 is illustrated as a V-shaped groove (shown in FIG. 2d), U-shaped groove (shown in FIG. 2e) or wavy shave groove (shown in FIG. 2f) and the light from the light mixing device 23 incident to the light distributing portion 15 may be total internal reflected under a specific angle due to the same principle described above. As the light from the light generation device 10 propagates to the light distributing portion 15, the light may be dispersed to both sides of the light mixing device 23 via the light distributing portion 15. Therefore, the light from the light generation device 10 may be mixed uniformly. In one embodiment of the present invention, from-a top views of FIGS. 2a–2c and 2d–2e, the V-shaped groove of the light distributing portions 231, 232 and 233 and the V-shaped groove of the light distributing portion 15 are not parallel to each other. That is, as shown in FIGS. 2d–2f, the V-shaped groove of the light distributing portions 231. 232 and 233 has an extension direction D1 and the V-shaped groove of the light distributing portion 15 has an extension direction D2 different from D1. In another embodiment of the present invention, the uniformity of the mixed planar light generated by the light generation device 10 is better as the V-shaped grooves of the dispersing devices 231, 232 and 233 and the light distributing portion 15 are perpendicular to each other.

FIGS. 2d–2f is a schematic cross-sectional view of a light mixing device 23 and a planar light generation device 14. The bottom of the planar light generation device 14 may comprise a reflection layer 141 for reflecting the light emitted to the bottom of the planar light generation device 14 to enhance the light emitting efficiency. The top of the planar light generation device 14 may comprise a light distributing portion 15 for receiving the mixed linear light to generate a planar light. In one embodiment of the present invention, the structure of the light distributing portion 15 may comprise a groove, wherein the shape of the groove may comprises V-shaped groove (shown in FIG. 2d), U-shaped groove (shown in FIG. 2e) or wavy shape groove (shown in FIG. 2f), or another shape that may be provided for reflecting light. In another embodiment of the present invention, a reflection layer 151 may be further disposed over the light distributing portion 15 to enhance the light distributing effect.

Moreover, in one embodiment of the present invention, the light mixing device 23 may be, for example, lodged in the planar light generation device 14, and the position for lodging the light mixing device 13 may be, for example, under the light distributing portion 15.

Figure 3A:
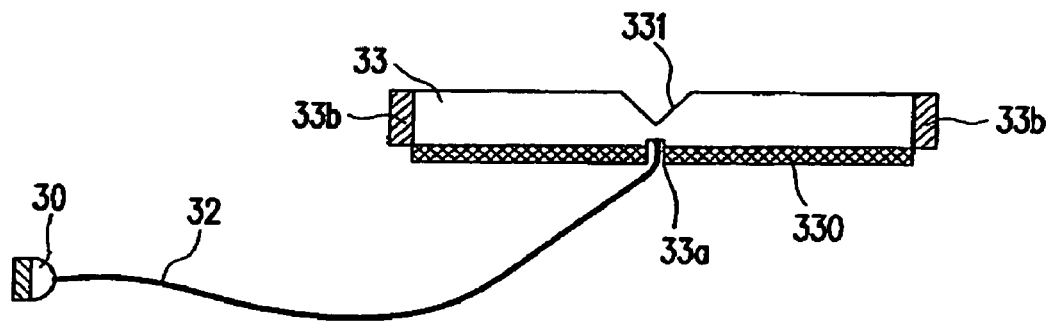
FIG. 3a is a schematic cross-sectional view of a light generation device and a light mixing device schematic view in accordance with still another embodiment of the present invention.
Figure 3B:
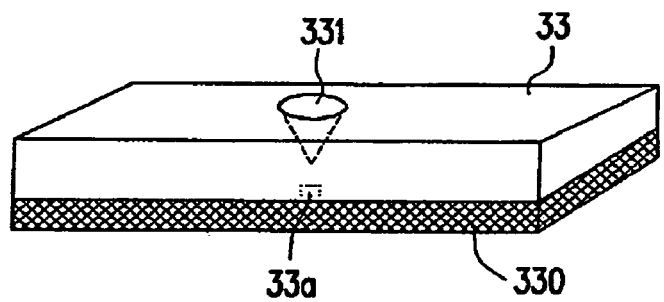
FIG. 3b is a schematic cross-sectional view of a structure of a light distributing portion of a light mixing device in accordance with an embodiment of the present invention.

FIGS. 3a, 3b and 3c–3e illustrate the components of a backlight module comprising an independent light source according to still another embodiment of the present invention, wherein FIG. 3a illustrates schematic cross-sectional views of a light generation device and a light mixing device comprising, for example, a light generation device 30, The light transmission device 32 and a light mixing device 33. The light generation device 30 may be adopted for generating a white light, the white light may be constructed by, for example, a light emitted from a white light emitting component, or a mixed white light from a plurality of color light emitting components. The light transmission device 32 may be adopted for receiving and transporting the white light emitted from the light generation device 30. The light mixing device 33 may comprise a reflection layer 330 in the bottom for reflecting the light to the light mixing device 33 to enhance the light mixing efficiency. The light transmission device 32 may be connected to the bottom surface 33a of the light mixing device 33. The light mixing device 33 may be provided for mixing the light emitted from the light transmission devices 32 to generate a mixed linear light. The light mixing device 33 may comprise a light distributing portion 331. The structure of the light distributing portion 331 may comprise a concave cone groove or a groove, or another shape that may be provided for reflecting light. As shown in FIG. 3b, the light distributing portion 15 is illustrated as a concave cone groove. As the light from the light generation device 30 propagates to the light distributing portion 15, the light may be dispersed to both sides of the light mixing device 33 via the light distributing portion 15. Therefore, the light from the light generation device 30 may be mixed uniformly.

Figure 3C:
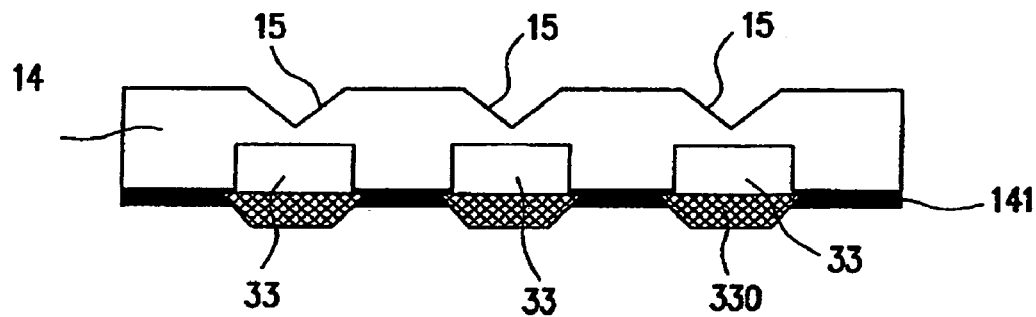
FIGS. 3c–3e are schematic cross-sectional views of a light mixing device and a planar light generation device in accordance with embodiments of the present invention.
Figure 3D:
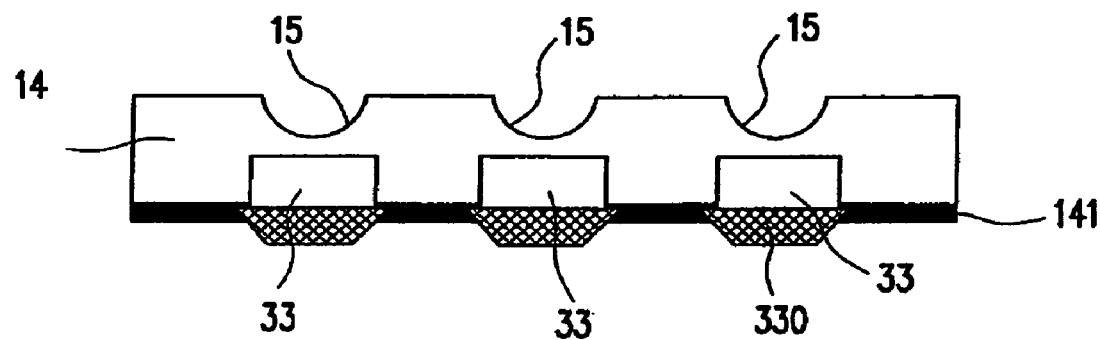
Figure 3E:
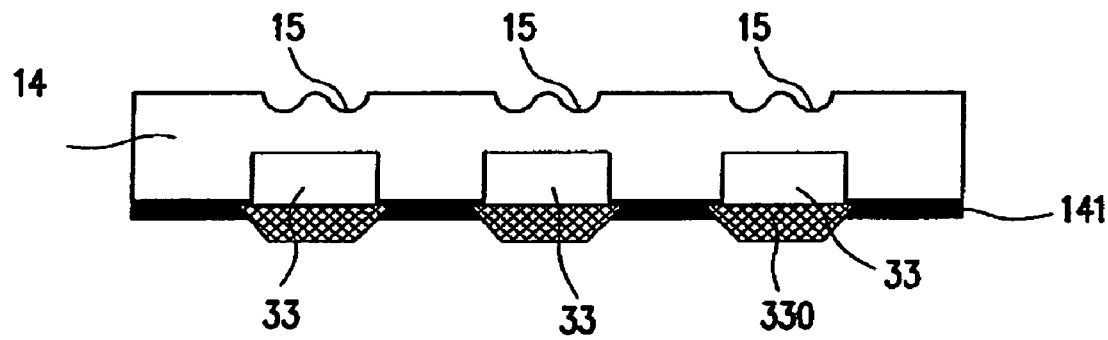

FIGS. 3c–3e are schematic cross-sectional views of light mixing device 33 and planar light generation device 14, wherein the bottom of the planar light generation device 14 may comprise a reflection layer 141 for reflecting the light to the planar light generation device 14 to enhance the light emitting efficiency. The top of the planar light generation device 14 may comprise a light distributing portion 15 for receiving the mixed linear light and generating a planar light. The structure of the light distributing portion 15 may comprise a groove, wherein the shape of the groove may comprises V-shaped groove (shown in FIG. 3c), U-shaped groove (shown in FIG. 3d) or wavy shape groove (shown in FIG. 3e), or another shape that may be provided for reflecting light. As shown in FIG. 3c, the light distributing portion 15 is illustrated as a concave cone groove. In another embodiment of the present invention, a reflection layer 151 may be further disposed over the light distributing portion 15 to enhance the light distributing effect.

Furthermore, the side of the light mixing device 33 may comprise a pattern 33b formed by, for example, a printing method (shown in FIG. 3a) The pattern may be provided for previously mixing the lights generated by the light generation device via reflection and/or refraction mutually.

In one embodiment of the present invention, the light generation device 10 or 30 may comprises, for example, light emitting diode (LED), fluorescence lamp, incandescent lamp or halogen lamp or another kind of light. The light generation device 10 or 30 may comprise one or more light emitting components. The light emitting component may provide, for example, a monochromatic light. The light emitting components may provide, for example, different color lights respectively. The light transmission devices may be arranged periodically or arranged in groups to generate a uniform light. In one embodiment of the present invention, the light transmission device may comprise, for example, optical fiber material or light pipe.

In one embodiment of the present invention, the material of the reflection layer may comprise metal layer, mirror surface, or any other material or device for reflecting light. In addition, reflection layer may be formed by a surface treatment method for reflecting light. The material of the light mixing device may comprise, for example, acrylic resin, cycloolefin copolymer (COC), poly-methyl methacrylate (PMMA), polycarbonate (PC), polyetherimide, fluorocarbon polymer or silicone or a mixture thereof, or any other material for reflecting light. The material of the planar light generation device or the light mixing plate may be similar to or same as the light mixing device. In one embodiment of the present invention, the backlight module comprising independent light may be adopted for large size flat panel display (FPD), wherein a plurality of backlight modules comprising independent light may be arranged in array in the large size flat panel display.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module having an independent light source, comprising:
    a planar light generation device including at lease one light distributing portion;
    a light mixing device connected to the planar light generation device;
    a light generation device for providing light; and
    at least one light transmission device connected between the light mixing device and the light generation device, wherein the light is transmitted to the light mixing device through the light transmission device and mixed by the light mixing device to generate a mixed linear light, and the mixed linear light is distributed by the light dispersing portion of the planar light generation device to generate a planar light.

2. The backlight module of claim 1, wherein the light generation device comprises at least one light emitting component.

3. The backlight module of claim 2, wherein the light emitting component constitutes a point light source.

4. The backlight module of claim 1, wherein the light generation device provides white light.

5. The backlight module of claim 4, wherein the white light is provided by a white light emitting component or provided by mixing the light emitted from a plurality of color light emitting components.

6. The backlight module of claim 1, wherein the light generation device provides red light, green light, and blue light.

7. The backlight module of claim 6, wherein the light transmission device comprises:
    a first light transmission device for receiving the red light and transmitting the red light to the light mixing device;
    a second light transmission device for receiving the green light and transmitting the green light to the light mixing device; and
    a third light transmission device for receiving the blue light and transmitting the blue light to the light mixing device.

8. The backlight module of claim 7, wherein the first light transmission device comprises an optical fiber or light pipe, the second light transmission device comprises an optical fiber or light pipe, and the third light transmission device comprises an optical fiber or a light pipe.

9. The backlight module of claim 1, wherein the light mixing device comprises a plurality of first light distributing portions.

10. The backlight module of claim 9, wherein the backlight module includes a plurality of light transmission devices, and the number of the first light distributing portions of the light mixing device is substantially equal to the number of the light transmission devices.

11. The backlight module of claim 9, wherein each of the light distributing portions comprises a first groove.

12. The backlight module of claim 11, wherein the first groove comprises a V-shaped groove, an U-shaped groove, or a wavy shape groove.

13. The backlight module of claim 9, wherein the first light distributing portion comprises a concave cone groove.

14. The backlight module of claim 1, wherein a side of the light mixing device comprises a pattern formed by printing.

15. The backlight module of claim 11, wherein the planar light generation device comprises a second light distributing portion.

16. The backlight module of claim 15, wherein the second light distributing portion comprises a second groove.

17. The backlight module of claim 16, wherein the second groove comprises a V-shaped groove, an U-shaped groove, or a wavy shape groove.

18. The backlight module of claim 15, wherein an extension direction of the first light distributing portion of the light mixing device and an extension direction of the second light distributing portion of the planar light generation device are different.

19. The backlight module of claim 15, wherein the light mixing device is received in the planar light generation device, and a position for receiving the light mixing device is under the second light distributing portion.

20. The backlight module of claim 1, wherein a peripheral of the planar light generation device further comprises a reflection layer for limiting a propagation direction of the mixed light.

21. The backlight module of claim 1, further comprises a reflection layer disposed over the light distributing portion.

22. The backlight module of claim 21, wherein the reflection layer comprises a metal layer, a mirror surface, or a reflective material formed by surface treatment.

23. The backlight module of claim 1, further comprises a reflection layer disposed over a peripheral of the light mixing device.

24. The backlight module of claim 23, wherein the reflection layer comprises a metal layer, a mirror surface, or a reflective material formed by surface treatment.

25. The backlight module of claim 1, wherein a material of the light mixing device comprises acrylic resin, cycloolefin copolymer (COC), poly-methyl methacrylate (PMMA), polycarbonate (PC), polyetherimide, fluorocarbon polymer, or silicone.

26. The backlight module of claim 1, wherein a material of the planar light generation device comprises acrylic resin, cycloolefin copolymer (COC), poly-methyl methacrylate (PMMA), polycarbonate (PC), polyetherimide, fluorocarbon polymer, or silicone.

27. A backlight module having an independent light source, comprising:
    a light mixing module, comprising:
        a planar light generation device comprising a light distributing portion; and a light mixing device connected to the planar light generation device;
a light generation device for providing light; and
a light transmission device connected between the light mixing device and the light generation device, wherein the light is transmitted to the light mixing device by the light transmission device and mixed to generate a mixed linear light, the mixed linear light is mixed by the light dispersing portion of the planar light generation device to generate a planar light.

* * * * *